Aug. 15, 1944.  J. C. CROWLEY  2,355,849
TORCH TIP
Filed March 28, 1941
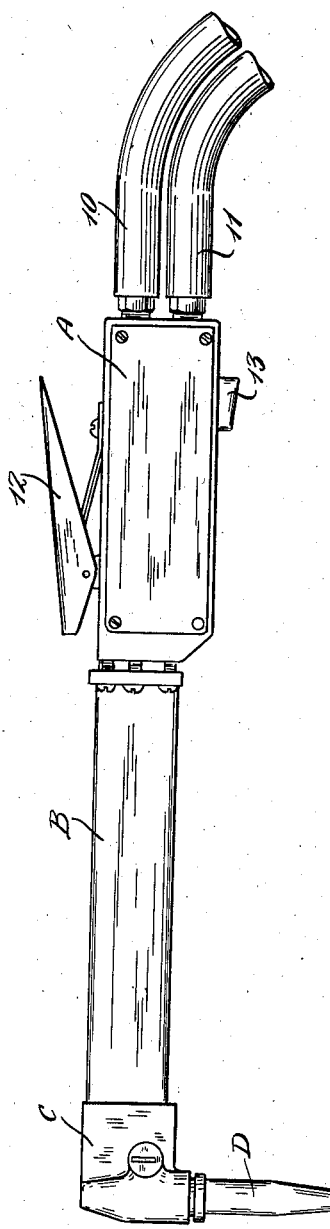
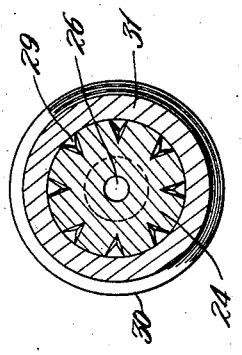
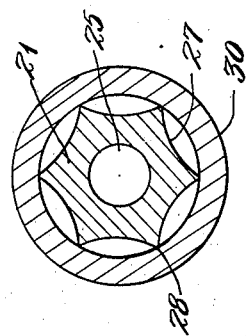
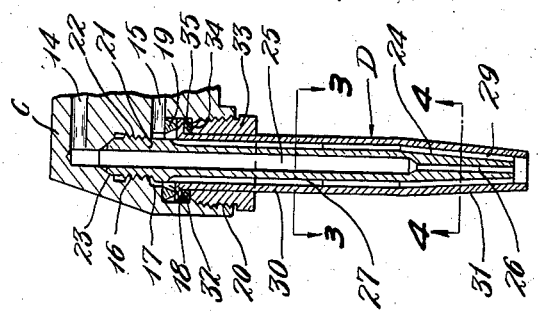
INVENTOR.
JOHN C. CROWLEY
BY
Kwis Hudson & Kent
ATTORNEYS Patented Aug. 15, 1944

2,355,849

UNITED STATES PATENT OFFICE 2,355,849

TORCH TIP

John C. Crowley, Cleveland Heights, Ohio, assignor to The Dill Manufacturing Company, Cleveland, Ohio, a corporation of Ohio Original application June 16, 1939, Serial No. 279,499. Divided and this application March 28, 1941, Serial No. 385,714

1 Claim. (Cl. 158—27.4)

This invention relates to a tip or nozzle for a cutting torch or blow pipe particularly adapted to be used for cutting or welding metal or for similar purposes.

This application is a division of my application Serial No. 279,499, filed June 16, 1939.

A cutting torch or blow pipe of the type with which the tip or nozzle embodying the present invention is used is connected to a source of suitable inflammable gas under pressure and also to a source of oxygen under pressure, the gas and oxygen being suitably mixed in the torch to produce the required and correct combustible mixture.

There is also provision in a torch of this type for issuing therefrom a jet of high pressure oxygen that is not mixed with the inflammable gas.

When a torch of this kind is used to cut metal the metal is first preheated by means of the flame produced at the nozzle or tip of the torch by the ignited combustible mixture of gas and oxygen, and after the metal has been sufficiently heated the jet of the high pressure oxygen unmixed with the inflammable gas is directed against the metal and acts to destroy the carbon in the metal and to effect a severing thereof.

When the torch is used for the welding of metal it is only necessary to employ the flame of the ignited combustible mixture of oxygen and gas.

An object of the invention is to provide an improved tip or nozzle for a cutting torch or blow pipe of the type specified.

Another object is to provide an improved tip or nozzle for a cutting torch or blow pipe of the type specified and wherein the passages through the tip or nozzle are so shaped and designed as to assist in mixing the oxygen and gas of the combustible mixture and to discharge the same at the end of the tip or nozzle in the proper amounts and in close proximity to the outer end of the central passage through the tip or nozzle for the high pressure oxygen.

Another object is to provide an improved tip or nozzle for a cutting torch or blow pipe of the type specified and which is so constructed that it may be readily assembled and the various parts thereof held in their proper relative positions.

Further and additional objects and advantages not hereinbefore referred to will become more apparent hereinafter during the detailed description which is to follow of an embodiment of the invention.

Referring to the accompanying drawing,

Fig. 1 is an elevational view on a reduced scale of a cutting torch or blow pipe to the head of which is attached a tip or nozzle constructed in accordance with the present invention.

Fig. 2 is a longitudinal sectional view through the tip or nozzle and a portion of the head of the torch or blow pipe shown in Fig. 1.

Fig. 3 is a transverse sectional view through the tip or nozzle taken substantially on line 3—3 of Fig. 2 looking in the direction of the arrows, and Fig. 4 is a transverse sectional view through the tip or nozzle and is taken substantially on line 4—4 of Fig. 2 looking in the direction of the arrows.

The cutting torch or blow pipe shown in Fig. 1 comprises a handle or body A, a tube or hand grip portion B, and a head C. The handle or body A is provided with passages, one of which is for the high pressure oxygen that constitutes the cutting jet, while the others are for the oxygen and inflammable gas, respectively, which constitute the combustible mixture. The oxygen passages are in communication with conduits 10 and the inflammable gas passage with the conduit 11, said conduits 10 and 11 being connected with a suitable source of supply of oxygen under pressure and inflammable gas.

The high pressure oxygen passage is valve regulated and said valve can be controlled manually by the operator by means of the lever 12. The other oxygen passage and the inflammable gas passage are regulated by valves also manually controlled by the operator through the control member or lever 13. These last mentioned passages extend to automatic means for regulating the flow pressures of the oxygen and inflammable gas that go to make up the combustible mixture.

The passages in the handle or body A are connected by means of tubes carried in the hand grip portion B with passages in the head C. The passage in the head C for the high pressure cutting oxygen is indicated in Fig. 2 at 14. The passages in the head C for the oxygen and gas which make the combustible mixture are not shown in the drawing but extend to a mixing chamber and after the oxygen and gas have been mixed into the combustible mixture the latter is conducted by means of a passage 15 formed in the head to the tip or nozzle, see Fig. 2.

The construction of the handle or body A and the parts contained therein, the hand grip portion B and the head C including the mixing chamber, are not illustrated herein and need not be explained in detail since they are fully illustrated and described in my said application Serial No. 279,499, of which the present application is a division.

It will be understood that although the tip or nozzle is shown in the drawing and will be described herein as used with a particular form of cutting torch or blow pipe construction, that said tip or nozzle is susceptible of use with cutting torches or blow pipes of different constructions.

As already stated the passage 14 in the head C is for the high pressure cutting oxygen, while the passage 15 in the head leads from the mixing chamber and is for the purpose of conducting the combustible mixture to the tip or nozzle. The passage 14 in the head C communicates with the conical or tapered upper end of a threaded bore 16 formed in the head and which bore, in turn, communicates at its lower end with a counterbore 17 that is in communication with the passage 15 from the mixing chamber. The counterbore 17 in turn communicates with a larger counterbore 18 that is provided on its bottom wall with an annular V-shaped downwardly projecting rib 19. The counterbore 18 communicates with a larger downwardly facing threaded counterbore 20, and the bores and counterbores just referred to in the head C receive the inner and outer members of the tip or nozzle which is indicated generally at D, as well as the clamping nut which holds said members in assembled position in the head.

The tip or nozzle D includes an inner member 21 that is threaded exteriorly adjacent its upper end, as indicated at 22, to enable the inner member 21 to be screwed into the threaded counterbore 16 in the head and to have the conical upper end 23 of the inner member seat against the conical or tapered end of the counterbore 16, as clearly shown in Fig. 2.

The inner member 21 of the tip or nozzle is tapered adjacent and toward its outer end 24 as also indicated in Fig. 2. In addition the inner member 21 of the tip or nozzle is provided with a centrally disposed bore extending throughout the length of the inner member and composed of a portion 25 of relatively large diameter and communicating at its inner or upper end with the passage 14 in the head C and with a portion 26 located in the tapered outer end 24 of the inner member and of relatively small or restricted cross sectional area.

The periphery of the inner member 21 above its tapered outer end 24 and below the threaded upper or inner end of the member is of concave polygonal, in this instance hexagonal, configuration, as indicated at 27 in Figs. 2 and 3. It will be noted that the corners or angles 28 formed by the adjacent concave portions are relatively sharp for a purpose later to be explained.

The tapered outer end 24 of the inner member 21 is provided on its periphery with a plurality of circumferentially spaced longitudinally extending V-shaped grooves 29 of uniform depth throughout as clearly indicated in Figs. 2 and 4.

The outer or shell member 30 of the tip or nozzle is tubular in shape and has its outer end 31 tapered to substantially the same degree as the outer tapered end 24 of the inner member. The tapered outer end 31 of the outer member extends slightly beyond the extremity of the tapered outer end 24 of the inner member when the members are assembled as indicated in Fig. 2. It should be understood that the outer ends of both members may be flush.

The outer member 30 telescopes upon the inner member 21 and is provided at its inner or upper end with an outwardly extending annular flange 32 located in the counterbore 18 of the head C and in engagement with the sharp edge of the tapered rib 19 in said counterbore as clearly shown in Fig. 2. The outer member 30 of the tip or nozzle is held in assembled position with respect to the inner member 21 and the head C by means of an assembly or clamping nut 33 screwed into the threaded counterbore 20 of the head C and having a tapered or pointed inner edge 34 engaging a packing gasket 35 interposed between said edge and the underside of the flange 32 of the outer member.

It will be seen that the assembly nut 33 holds the flange 32 in tight engagement with the pointed edge of the tapered rib 19 and it should be understood that when the inner and outer members of the tip or nozzle are assembled the sharp corners 28 between the concave peripheral portions 27 of the inner member 21 embed themselves in the outer member or shell and prevent relative turning movement between the inner and outer members.

It will also be noted that the concave peripheral portions 27 of the inner member together with the interior wall of the outer member provide longitudinally extending passages between the inner and outer members which communicate at their upper ends with the counterbore 18 in the head C, which counterbore in turn is in communication with the counterbore 17.

These passages also communicate at their lower ends with passages formed by the V-shaped grooves 29 of the inner member and the inner wall of the tapered portion 31 of the outer member. It will be understood that the combustible mixture of oxygen and inflammable gas flows through the passage 15 in the head C, the counterbores 17 and 18 and thence into the passages in the tip or nozzle just referred to.

The passages formed of the concave peripheral portions of the inner member and the inner wall of the outer member are of relatively large capacity, whereas the passages formed by the V-shaped grooves 29 in the tapered outer end 24 of the inner member and the inner surface of the tapered outer end 31 of the outer member are of relatively small capacity. These last named passages retard the outflow of the intermixed oxygen and gas to the proper extent to provide the correct flame at the tip of the torch and also are effective to cause the oxygen and gas forming the mixture in the passages of large capacity to become more thoroughly intermingled.

The construction of the outer end of the tip or nozzle is such that the ignited combustible mixture provides a concentrated flame for the preheating of the metal to be cut or for the welding operation. The high pressure oxygen of the cutting jet is emitted from the outer end of the tip or nozzle in a fine jet defined by the portion 26 of the central bore through the inner member of the tip or nozzle.

Although a preferred embodiment of the invention has been illustrated and described herein the invention is susceptible of various modifications and adaptations within the scope of the appended claim.

Having thus described my invention what I claim is:

In combination, a cutting torch head having an oxygen passage therein and provided with a threaded bore communicating with said passage and which bore has a conical inner end, said head having a counterbore communicating with said bore and a second counterbore communicating with said first counterbore, an annular outwardly projecting rib at the inner end of said second counterbore, said head being provided with a passage for a combustible mixture of inflammable gas and oxygen communicating with said first counterbore, said head being provided with a third counterbore internally threaded and communicating with said second counterbore, an inner tip member having external threads screwed into said bore and provided with a conical inner end seating on the conical end of said bore, said member being of less diameter than said first and second counterbores and having a longitudinal passage therethrough communicating at its inner end with said oxygen passage and which passage in said member includes an elongated portion of relatively large diameter extending from the inlet end of said passage toward the outlet end and a substantially shorter portion of relatively small diameter adjacent the outlet end of said passage, said member having an external portion extending from the second counterbore toward the outer end thereof and of polygonal concave configuration having a plurality of longitudinally extending sharp corner edges with grooves of relatively large area intermediate said edges, said member having at its outer end a tapered portion provided on its exterior surface with a plurality of longitudinally extending relatively narrow grooves of constant depth throughout and in communication with the grooves of the first named external portion of said member, a shell member telescoped upon the first member and having at its inner end an annular radially extending flange engaging said rib in the second named counterbore, an assembly nut on said shell member and screwed into said third named counterbore and maintaining said flange in engagement with said rib, said shell member having cylindrical and tapered portions embracing respectively the first named exterior portion and the tapered portion of said inner tip member, the sharp edges of the first named exterior portion of the inner tip member engaging and biting into the material of the shell member and interlocking said members against relative rotation, the grooves between said edges of the inner tip member and the interior of the shell member constituting passages of relatively large capacity and in communication with said second named counterbore of said head, the grooves in the tapered portion of the inner tip member together with the inner surface of the shell member constituting passages of relatively small capacity, while the clearance between said member and the first and second counterbores and said rib constitutes an annular passage connecting said passages of large capacity with said combustible mixture passage.

JOHN C. CROWLEY.